(12) United States Patent
Cooper et al.

(10) Patent No.: US 12,180,115 B1
(45) Date of Patent: Dec. 31, 2024

(54) YELLOW SODA-LIME-SILICA GLASS

(71) Applicant: Owens-Brockway Glass Container Inc., Perrysburg, OH (US)

(72) Inventors: Scott Cooper, Maumee, OH (US); Casey Townsend, Perrysburg, OH (US); Chase Davis, Tulsa, OK (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 658 days.

(21) Appl. No.: 17/466,066

(22) Filed: Sep. 3, 2021

(51) Int. Cl.
| | |
|---|---|
| *C03C 3/087* | (2006.01) |
| *C03B 9/30* | (2006.01) |
| *C03B 25/00* | (2006.01) |
| *C03C 4/02* | (2006.01) |

(52) U.S. Cl.
CPC ............... *C03C 3/087* (2013.01); *C03B 9/30* (2013.01); *C03B 25/00* (2013.01); *C03C 4/02* (2013.01); *Y10T 428/131* (2015.01)

(58) Field of Classification Search
CPC .. C03C 3/087; C03C 4/02; C03B 9/30; C03B 25/00; Y10T 428/131
See application file for complete search history.

(56) References Cited

U.S. PATENT DOCUMENTS

| | | |
|---|---|---|
| 3,887,348 A | 6/1975 | Plumat et al. |
| 4,134,747 A | 1/1979 | Pierson et al. |
| 7,358,205 B2 | 4/2008 | Narita et al. |
| 7,659,221 B2 | 2/2010 | Arbab et al. |
| 8,127,572 B2 | 3/2012 | Dorfeld et al. |
| 8,869,558 B2 | 10/2014 | Yamamoto et al. |
| 2005/0003726 A1* | 1/2005 | Zguris ............. C03C 13/00 442/181 |
| 2005/0054512 A1 | 3/2005 | Brocheton et al. |
| 2006/0211563 A1 | 9/2006 | Arbab et al. |
| 2006/0249199 A1 | 11/2006 | Thomsen et al. |
| 2007/0037688 A1 | 2/2007 | Smith et al. |
| 2007/0149380 A1 | 6/2007 | Dorfeld et al. |
| 2010/0122728 A1 | 5/2010 | Fulton et al. |
| 2010/0179044 A1 | 7/2010 | Sellier et al. |

\* cited by examiner

*Primary Examiner* — James C Yager

(57) ABSTRACT

A soda-lime-silica glass that has a composition comprising 60-80 wt % $SiO_2$; 8-18 wt % $Na_2O$; 5-15 wt % CaO; 0-3 wt % $Al_2O_3$; 0.0010-0.050 wt % silver expressed as $Ag_2O$; and 0.005-0.30 wt % bismuth expressed as $Bi_2O_3$ is disclosed. Light-scattering silver colloids are dispersed throughout the soda-lime-silica glass to provide the glass with a yellow coloration. The soda-lime-silica glass may be in the form of a body that provides a shape of a container that defines an internal containment space. The body of such a container includes a base, a mouth that defines an opening to the internal containment space, and a wall that externs from the base to the mouth. A method of making a glass container that exhibits a yellow coloration is also disclosed.

16 Claims, 3 Drawing Sheets

YELLOW SODA-LIME-SILICA GLASS

The present disclosure relates to soda-lime-silica glass and, more specifically, to a soda-lime-silica glass composition that exhibits a yellow coloration.

BACKGROUND

Glass is a rigid amorphous solid that exhibits a disordered (i.e., no long-range order) and spatially crosslinked oxide network. One of the most prevalent glasses in the marketplace today is soda-lime-silica glass. Due to its workability, chemical stability, and recyclability, as well as the relatively inexpensive cost of the needed raw materials, soda-lime-silica glass is used extensively to manufacture hollow glass containers such as bottles and jars. In terms of its composition, soda-lime-silica glass comprises a ternary oxide network of $SiO_2$—$Na_2O$—$CaO$. The silica component ($SiO_2$) is the largest oxide by weight and constitutes the primary network forming material of the glass. The $Na_2O$ component functions as a fluxing agent that reduces the melting, softening, and glass transition temperatures of the glass, as compared to pure silica glass, and the CaO component functions as a stabilizer that improves certain physical and chemical properties of the glass including its hardness and chemical resistance. Based on the total weight of the glass, soda-lime-silica glass has a composition that includes 60 wt % to 80 wt % $SiO_2$, 8 wt % to 18 wt % $Na_2O$, and 5 wt % to 15 wt % CaO.

In addition to $SiO_2$, $Na_2O$, and CaO, the composition of soda-lime-silica glass may include other oxide and non-oxide materials that act as network formers, intermediate formers, network modifiers, colorants, decolorants, redox agents, or other agents that affect the properties of the final glass. Some examples of these additional materials include aluminum oxide ($Al_2O_3$), magnesium oxide (MgO), potassium oxide ($K_2O$), carbon, sulfates, and/or elemental or oxide forms of one or more of iron, selenium, chromium, barium, manganese, cobalt, nickel, sulfur, vanadium, titanium, copper, niobium, molybdenum, lithium, silver, strontium, indium, tin, gold, cerium, praseodymium, neodymium, europium, gadolinium, and erbium. Aluminum oxide is one of the more commonly included materials typically present in an amount up to 3 wt % based on the total weight of the glass-because of its ability to improve the chemical durability of the glass and to reduce the likelihood of devitrification. Regardless of what other oxide and/or non-oxide materials are present in the soda-lime-glass besides $SiO_2$, $Na_2O$, and CaO, the sum total of those additional materials is preferably 10 wt % or less, or more narrowly 5 wt % or less, based on the total weight of the glass.

Soda-lime-silica glass can be manufactured to exhibit a number of visual colorations including a yellow coloration. Containers formed from yellow glass may be desired for decorative purposes, to help protect the contents of the containers from natural and synthetic light, or for some other reason. While glass having a vibrant yellow color may be coveted for certain applications, conventional techniques for producing yellow-colored glass are generally considered less than ideal. One of the main drawbacks of the conventional production of yellow-colored glass is that cadmium in combination of sulfur, which provides a content of cadmium sulfide (CdS), or lead in combination with antimony is incorporated into the glass composition as a colorant to impart the yellow coloration. However, both cadmium and lead are heavily regulated materials that are generally not available for inclusion within soda-lime-silica glass. To that end, a soda-lime-silica glass that exhibits a yellow coloration while comprising a composition that is devoid of cadmium (as cadmium sulfide) and lead is needed along with a process for manufacturing yellow soda-lime-silica glass.

SUMMARY OF THE DISCLOSURE

The present disclosure relates to soda-lime-silica glass that exhibits a yellow coloration. The soda-lime-silica glass has a composition that includes 60-80 wt % $SiO_2$, 8-18 wt % $Na_2O$, 5-15 wt % CaO, and 0-3 wt % $Al_2O_3$—the oxide components that constitute a base oxide portion of the glass composition and categorize the glass as "soda-lime-silica glass"—and further comprises 0.0010-0.050 wt % silver, expressed as $Ag_2O$, and 0.005-0.30 wt % bismuth, expressed as $Bi_2O_3$. The silver included within the glass composition forms light-scattering silver colloids dispersed within the glass and the bismuth is thought to serve as a nucleating agent for the silver colloids. Without being bound by theory, the inclusion of bismuth in the glass composition as a nucleating agent increases the number of nucleation sites for silver colloid formation within the glass and, as such, for a given amount of silver, increases the quantity of dispersed silver colloids within the glass. This amplification of silver colloid nucleation sites allows the silver content in the glass to remain as low as possible, which shifts the coloration of the glass towards yellow and away from amber. The composition of the soda-lime-silica glass may also include other components including one or more of the following to help ensure the glass exhibits a yellow coloration: 0-0.4 wt % tin expressed as SnO, 0-0.15 wt % iron expressed as $Fe_2O_3$, and 0-0.2 wt % sulfur expressed as $SO_3$.

The glass may be subjected to striking after being formed into a glass container and annealed to enhance the intensity of the yellow coloration. For example, after the soda-lime silica glass is produced with the disclosed glass composition in molten form by melting a vitrifiable feedstock material in a furnace or melter, the glass may be formed into a glass container by any suitable technique. The glass container may then be annealed, which involves reheating the glass to a first temperature above an annealing point of the glass and then slowly cooling the glass to remove thermally-induced internal strain that may be present within the glass. Following annealing, the glass container may be struck by again reheating the glass to a second temperature above the first temperature for a period of time to controllably grow the silver colloids present within the soda-lime-silica glass. In a preferred embodiment, the soda-lime-silica glass of the glass container may be heated to a temperature between 510° C. to 575° C. during annealing and, subsequently, may be heated to a temperature between 575° C. to 670° C. to strike a more intense yellow coloration in the glass.

The present disclosure embodies a number of aspects that can be implemented separately from or in combination with each other to provide a method for producing glass. According to one embodiment of the present disclosure, a soda-lime-silica glass has a composition that includes 60-80 wt % $SiO_2$; 8-18 wt % $Na_2O$; 5-15 wt % CaO; 0-3 wt % $Al_2O_3$; 0.0010-0.050 wt % silver expressed as $Ag_2O$; and 0.005-0.30 wt % bismuth expressed as $Bi_2O_3$. Additionally, light-scattering silver colloids are dispersed throughout the soda-lime-silica glass to provide the glass with a yellow coloration.

According to another embodiment of the present disclosure, a glass container includes a body of soda-lime-silica glass that provides a shape of the glass container about a central longitudinal axis and defines an internal containment space. The body of soda-lime-silica glass includes a base, a mouth that defines an opening to the internal containment space, and a wall that extends from a perimeter of the base along the longitudinal axis of the container to the mouth. The body of soda-lime-silica glass has a composition comprising 60-80 wt % $SiO_2$; 8-18 wt % $Na_2O$; 5-15 wt % CaO; 0-3 wt % $Al_2O_3$; 0.0010-0.050 wt % silver expressed as $Ag_2O$; and 0.005-0.30 wt % bismuth expressed as $Bi_2O_3$. Moreover, light-scattering silver colloids are dispersed throughout the body of soda-lime-silica glass to provide the glass with a yellow coloration.

According to yet another embodiment of the present disclosure, a method of making a glass container includes at least several steps. One step involves producing a melt of soda-lime-silica glass having a composition comprising 60-80 wt % $SiO_2$; 8-18 wt % $Na_2O$; 5-15 wt % CaO; 0-3 wt % $Al_2O_3$; 0.0010-0.050 wt % silver expressed as $Ag_2O$; and 0.005-0.30 wt % bismuth expressed as $Bi_2O_3$. Another step of the method involves forming a glass container from the melt of soda-lime-silica glass. The glass container includes a body that provides a shape of the glass container and which is comprised of the soda-lime-silica glass. Moreover, light-scattering silver colloids are dispersed throughout the body of soda-lime-silica glass to provide the glass with a yellow coloration. Yet another step of the method involves annealing the glass container by heating the body of soda-lime-silica glass to a temperature above an annealing point of the soda-lime-silica glass followed by cooling the glass container to a temperature below the strain point of the soda-lime-silica glass.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

Figure 1:
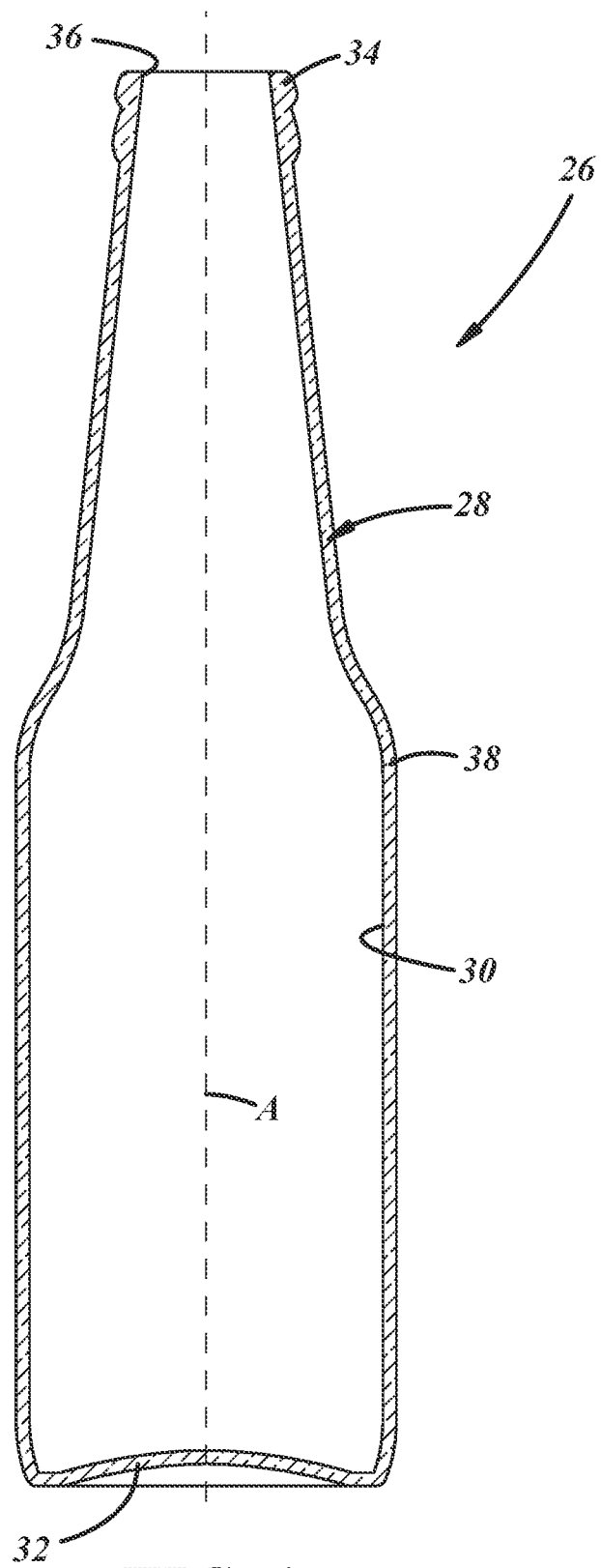
FIG. 1 is an elevated cross-sectional view of a glass container that includes a body of soda-lime-silica glass having a composition that provides the glass with a yellow coloration according to various embodiments of the present disclosure.

A soda-lime-silica glass that is yellow in coloration has a composition that does not rely on the presence of cadmium (as CdS) or lead to provide the yellow coloration. The composition of the soda-line-silica glass includes a base oxide portion comprised of $SiO_2$, $Na_2O$, CaO, and optionally $Al_2O_3$, and further includes silver along with bismuth as a nucleating agent to impart a yellow coloration to the glass. The combination of silver, expressed in the composition as $Ag_2O$, and bismuth, expressed in the composition as $Bi_2O_3$, promotes the formation of light-scattering silver colloids throughout the glass, thus allowing a relatively small amount of silver to provide the glass with a yellow coloration. In addition to silver and bismuth, the composition may also include at least one of tin expressed as SnO, iron expressed as $Fe_2O_3$, sulfur expressed as $SO_3$, or any combination of those materials to help promote the yellow coloration in the soda-lime-silica glass, particularly when the glass is in a reduced state. And, during the manufacture of a glass article from the soda-lime-silica glass, the glass article may be struck by the application of heat following annealing to increase the intensity of the yellow coloration in the glass. The glass article formed from the soda-lime-silica glass may be a glass container.

The composition of the soda-lime-silica glass may include a variety of oxide and non-oxide materials. The composition includes a base oxide portion comprised of $SiO_2$, $Na_2O$, CaO, and optionally $Al_2O_3$, which are the oxide components that categorize the glass as "soda-lime-silica" glass. The amount by weight of $SiO_2$, $Na_2O$, CaO, and optionally $Al_2O_3$ that are included in the composition, based on the total weight of the glass, is set forth below in Table 1 in both broad and narrow weight percent ranges. And while other oxides not listed may be present as well, the composition of soda-lime-silica glass is free of cadmium and lead, as noted above, and is also preferably free of $P_2O_5$ and $B_2O$.

TABLE 1

| Base Oxide Portion of the Composition of SLS Glass | | |
|---|---|---|
| Component | Weight % Broad Range | Weight % Narrow Range |
| $SiO_2$ | 60-80 | 71-74 |
| $Na_2O$ | 8-18 | 12-15 |
| CaO | 5-15 | 9-13 |
| $Al_2O_3$ | 0-3 | 0.9-1.5 |

The composition of the soda-lime-silica glass further includes silver (expressed $Ag_2O$) and bismuth (expressed as $Bi_2O_3$) to promote a yellow coloration within the glass. Additional material components may also be included in the composition to help in that regard. These additional components include at least one of tin (expressed as SnO), iron (expressed as $Fe_2O_3$), or sulfur (expressed as $SO_3$). The amount by weight of SnO, $Fe_2O_3$, and $SO_3$ that may be included in the composition, based on the total weight of the glass, is set forth below in Table 2, although all of the components need not necessarily be present together in the soda-lime-silica glass composition. Both a broad weight percent range and a narrower weight percent range for each of the above-mentioned additional material components are set forth in Table 2.

TABLE 2

Additional Components in the Composition
of SLS Glass that Promote a Yellow Coloration

| Component | Weight % Broad Range | Weight % Narrow Range |
|---|---|---|
| $Ag_2O$ | 0.0010-0.050 | 0.0025-0.0050 |
| $Bi_2O_3$ | 0.005-0.30 | 0.01-0.16 |
| SnO | 0-0.4 | 0.05-0.20 |
| $Fe_2O_3$ | 0-0.15 | 0.01-0.10 |
| $SO_3$ | 0-0.2 | 0.005-0.03 |

The silver forms light-scattering silver colloids dispersed within the glass. The bismuth is believed to serve as a nucleating agent for the silver colloids; that is, the bismuth provides nucleation sites where the silver colloids can nucleate and grow. By including bismuth in the soda-lime-silica glass composition, and without being bound by theory, the number of silver colloid nucleation sites present throughout the glass is increased, and, thus, the quantity of silver colloids formed throughout the glass is increased for a given amount of silver. The nucleating effect of bismuth limits the size of the dispersed silver colloids by avoiding the need to rely on a greater amount of silver to produce a corresponding quantity of silver colloids. As a result, the silver colloids with the soda-lime silica glass scatter light in a way that causes the glass to transmit light at wavelengths in the yellow range of the visible light spectrum, thereby promoting a yellow coloration in the glass. By contrast, the larger silver colloids that would form with an increased silver content in the glass—the size of silver colloids generally increases as the amount of silver in the glass increases-transmit light at wavelengths in the orange range of the visible light spectrum so as promote an amber coloration in the glass.

The tin, iron, and/or sulfur that may be included in the composition of the soda-lime-silica glass can help the glass exude a yellow coloration. The tin may be added to the composition to promote silver colloid growth. The addition of tin can help enhance the yellow coloration in soda-lime-glass that is unstruck or struck at relatively low temperatures and/or for a relatively short period of time. Since larger silver colloids tend to favor an amber coloration in the glass, the amount of tin included in the soda-lime-silica glass composition can be reduced or even eliminated if the glass is struck at higher temperatures and/or for longer periods of time. The exact amount of tin (expressed as SnO) that is introduced into the composition within the confines of the range set forth above in Table 2 depends on several factors including the amount of silver and bismuth that are included in the composition as well as striking conditions, if striking is practiced, to which the glass is subjected. In general, however, the addition of tin to the composition intensifies the yellow coloration of the soda-lime-silica glass, especially when the glass is struck in accordance with the striking procedure described in more detail below.

The iron and sulfur may be added to the composition of the soda-lime-silica glass within the confines of the ranges set forth above in Table 2 to impart a yellow coloration to the glass. At these low concentrations, and particularly when the soda-lime-silica glass is in a reduced state, ferric iron ($Fe^{3+}$) and sulfide ($S^{2-}$) ions derived from the iron and the sulfur, respectively, form a ferric-sulfide chromophore within the glass. This chromophore is typically associated with amber colored glass. But at lower amounts of iron and sulfur, the chromophore exhibits a less intense coloration and, as such, appears yellow. Adjusting the amount of iron and sulfur in the soda-lime-silica glass composition can thus serve to intensify the yellow coloration in the glass, which may be helpful if lesser amounts of silver, bismuth, or tin (if present) are present in the composition, if the glass is unstruck, or if the glass is struck at relatively low temperatures and/or for a relatively short period of time. The formation of the ferric-sulfide chromophore may be supported if the glass is in a reduced state. Here, the glass is in a reduced state when the redox ratio ($Fe^{2+}/(Fe^{2+}+Fe^{3+})$) of the glass ranges from 0.50 to 0.99 or, more preferably, from 0.75 to 0.85. The glass may have its redox state shifted to the reduced state by adding a reducing agent, such as carbon, to the vitrifiable feedstock material that is melted to produce the glass as explained below.

Figure 4:
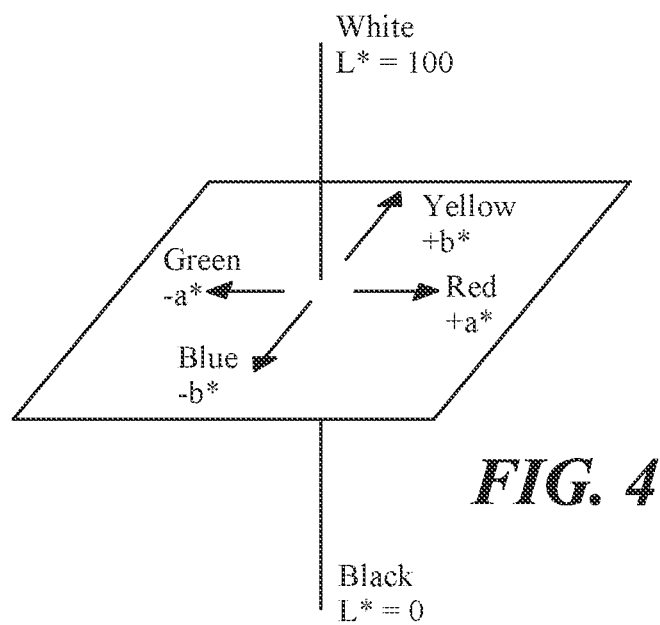
FIG. 4 is a generic depiction of a CIELAB color model having L*, a*, and b* channels for expressing a color space that captures the yellow coloration of the disclosed soda-lime-silica glass according to one embodiment of the present disclosure.

The yellow coloration of the soda-lime-silica glass may be identified by a color space on the CIELAB color model. The CIELAB color model expresses color in a three-dimensional integer space, as shown generically in FIG. 4, using three channels or axes: L*, a*, and b*. The lightness channel, L*, is an achromatic channel that gives an indication as to how light or how dark the color is on a scale from pure black (L*=0) to diffuse white (L*=100). The a* and b* channels are chromatic channels that represent the green-red component and the blue-yellow component of the color, respectively, with a neutral gray being represented by the intersection of the a* and b* channels (i.e., a*=0 and b*=0) and the midpoint of the lightness channel (i.e., L*=50). On the a* channel, a positive value represents a shift towards red and a negative value represents a shift towards green with the absolute value of the a* value expressing the magnitude of the shift in the green/red color component. Likewise, on the b* channel, a positive value represents a shift towards yellow and a negative value represents a shift towards blue with the absolute value of the b* value expressing the magnitude of the shift in the blue/yellow color component. Both the a* channel and the b* channel may range from −128 to +127.

Figure 5:
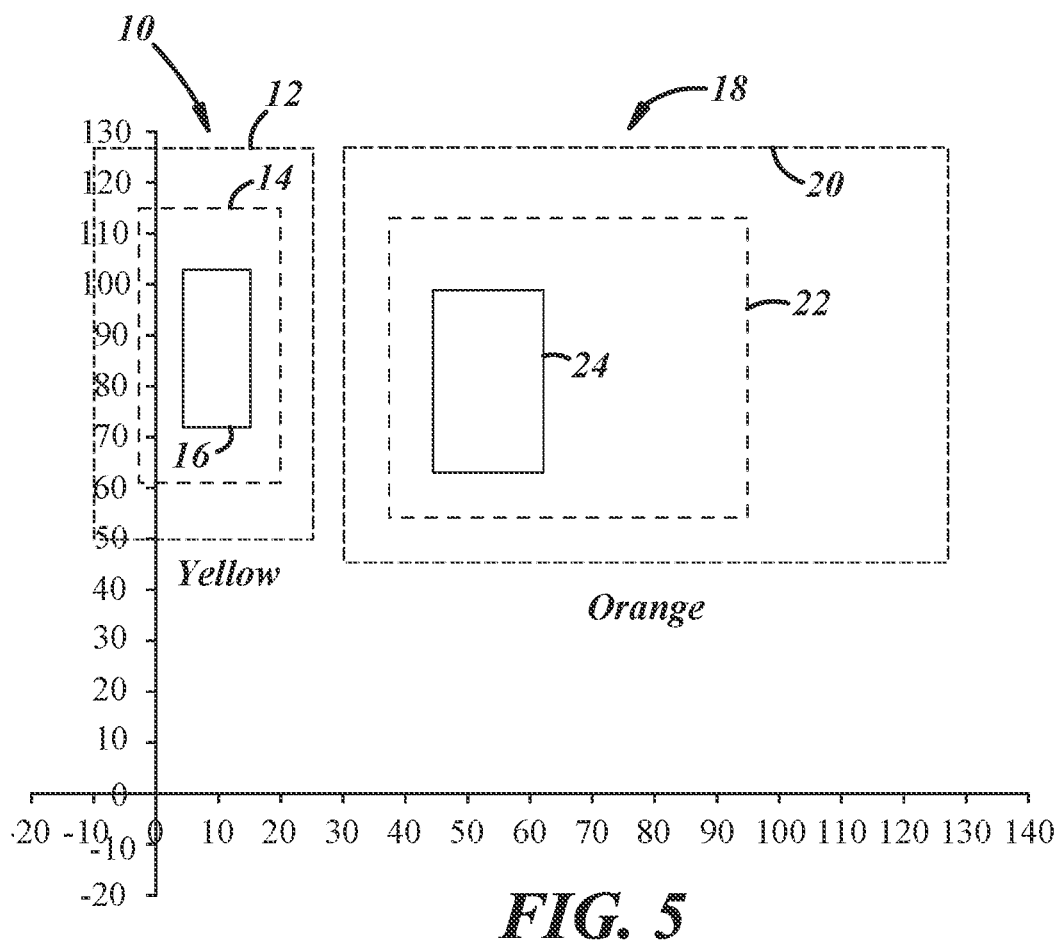
FIG. 5 is a depiction of a CIELAB color scale showing the a* and b* channels, while omitting the L* channel that intersects the a* and b* channels normal to the plane of the a* and b* channels, and further showing the color space of the yellow coloration of the disclosed soda-lime-silica glass according to one embodiment of the present disclosure.

A CIELAB color space 10 that defines the yellow coloration of the soda-lime-silica glass using a standard CIE 1964 observer adapted to D65 illuminant and a 100 visual field with 5-mm thick sample glass and assumed transmission after reflection losses in air of 91.74% is shown in FIG. 5. The L*, a*, and b* values that define the yellow coloration broadly (reference numeral 12), more narrowly (reference numeral 14), and most narrowly (reference numeral 16) are shown in FIG. 5 and reported in Table 3 below. By contrast, a CIELAB color space 18 that defines an orange or amber coloration using the same standard is also shown in FIG. 5 and reported in Table 3 to help demonstrate how the yellow coloration is different from an amber coloration. The L*, a*, and b* values that define the orange coloration broadly (reference numeral 20), more narrowly (reference numeral 22), and most narrowly (reference numeral 24) are also depicted in FIG. 5 and shown in Table 3. The intensity of the yellow coloration of the soda-lime-silica glass can be altered within the CIELAB yellow color space depending on the desired lightness or darkness of the yellow coloration.

TABLE 3

CIELAB Color Spaces for yellow and orange glass coloration

| | Broad Range | | Narrower Range | | Narrowest Range | |
|---|---|---|---|---|---|---|
| | min | max | min | Max | Min | max |
| Yellow | | | | | | |
| L* | 70 | 100 | 76 | 95 | 82 | 90 |
| a* | −10 | 25 | −3 | 20 | 4 | 15 |
| b* | 50 | 127 | 61 | 115 | 72 | 103 |
| Orange | | | | | | |
| L* | 42 | 100 | 51 | 86 | 60 | 72 |
| a* | 30 | 127 | 37 | 94.5 | 44 | 62 |
| b* | 45 | 127 | 54 | 113 | 63 | 99 |

A number of variances of the composition of the soda-lime-silica glass can produce the yellow coloration satisfying the above color characteristics. Indeed, soda-lime-silica glass compositions that include different amounts of silver and bismuth as well as different amounts of one or more of tin, iron, and sulfur can produce the yellow coloration of the same or different intensities. This is because a change in the content of each of the aforementioned constituents in the composition may shift the intensity of the yellow coloration of the glass towards clear glass (i.e., lighter yellow) on one end of the spectrum or towards amber/red glass (i.e., darker yellow) on the other end of the spectrum. To that end, the exact composition of the soda-lime-silica glass may be fluctuated with adjustments made to its yellow color-promoting constituents within the ranges specified above while still ultimately producing a yellow coloration of the desired intensity. Striking the soda-lime-silica glass as described below can also promote the yellow coloration and enhance its intensity by controllably growing the silver colloids dispersed throughout the glass.

Referring now to FIG. 1, the soda-lime-silica glass may be formed into a hollow glass container 26 such as a bottle or jar. The hollow glass container 26 that includes a body 28 comprised of the soda-lime-silica glass. The body 28 of the soda-lime-silica glass provides the container 26 with its shape about a central longitudinal axis A and defines an internal containment space 30. The body 28 of soda-lime-silica glass includes a base 32 that is axially closed, a mouth 34 that defines an opening 36 to the internal containment space 30, and a wall 38 that extends from a perimeter of the base 32 along the longitudinal axis A of the container 26 to the mouth 34. The base 32, the wall 38, and the mouth 34 may be provided in any of a wide variety of shapes and contours, which, in turn, enables extensive freedom in how the container 26 is designed and configured.

Figure 2:
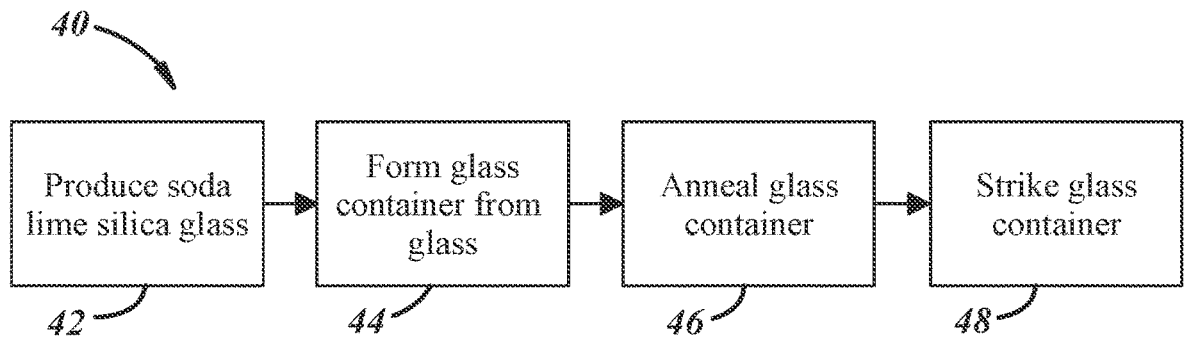
FIG. 2 is a flow chart depicting a glass-manufacturing process in which a glass article formed from the disclosed soda-lime-silica glass may be made according to one embodiment of the present disclosure.

The glass container 26 may be made by way of a glass-manufacturing process 40, which is depicted in FIG. 2. The process 40 may involve a glass-producing step 42, a forming step 44, an annealing step 46, and an optional striking step 48. In the glass-producing step 42, a melt of the soda-lime-silica glass is produced with its yellow color-promoting composition by melting a vitrifiable feedstock material. The vitrifiable feedstock material is any material that can be melted to produce molten soda-lime-silica glass having the compositional chemistry described above. For instance, the vitrifiable feedstock material may include a physical mixture of raw materials and, optionally, cullet (i.e., recycled glass). The raw materials may include sand, soda ash, and limestone as sources of $SiO_2$, $Na_2O$, and CaO in the composition, respectively, and may also include nepheline syenite, feldspar, and/or aplite as a source of $Al_2O_3$, silver oxide, silver nitrate, silver sulfate, silver carbonate, silver acetate, and/or elemental silver as a source of silver, bismuth oxide as a source of bismuth, stannous oxide as a source of tin, and salt cake and/or slag as s source of sulfur. Iron is generally a contaminant in sand and is introduced into the glass composition in that way. Cullet may also provide a source of $SiO_2$, $Na_2O$, and CaO, plus one or more of the other glass constituents depending the melt history and composition of the cullet. Still further, a reducing agent may be added to the vitrifiable feedstock material to shift the redox state of the glass to a reduced state, if desired. This may involve adding coke to the vitrifiable feedstock material in an amount that provides up to 1.0 wt % carbon, or more narrowly between 0.10-0.50 wt % carbon, in the vitrifiable feedstock material.

To produce the melt of the soda-lime-silica glass in molten form, the vitrifiable feedstock material is formulated to attain the soda-lime-silica glass composition and is then introduced into a furnace or melter and melted. The melt of the soda-lime-silica glass may have a temperature between 1400° C. and 1500° C. upon being formed. The resultant soda-lime-silica glass melt may subsequently be fined and thermally conditioned to prepare the glass for forming. "Fining" the glass refers to the process of reducing the concentration of entrained gas bubbles within the glass. Glass fining can be accomplished by maintaining the glass, with the introduction of heat, at a temperature between 1200° C. and 1500° C. to promotes gas bubble ascension out of the glass, typically in a fining vessel or a separate fining chamber of a furnace. Fining agents may also be added into the vitrifiable feedstock material that, when heated, release gases such as $O_2$ and $SO_2$, which in turn merge with and help remove smaller gas bubbles from the glass melt and/or increase the solubility of certain gas species within the glass matrix. Thermal conditioning of the glass refers to the process of controllably reducing the temperature of the glass in a forehearth or other vessel, after fining, until the glass reaches a temperature between 1150° C. and 1210° C. while also thermally homogenizing the glass.

In the forming step 44, the glass container 26 is formed from the melt of soda-lime-silica glass, preferably after the melt is fined and thermally conditioned. During this step, a defined portion of the melt of soda-lime-silica glass may be delivered to a glass container forming machine that includes a blank mold and a blow mold. The glass portion is first charged into an internal cavity of the blow mold. There, the glass portion is pressed or blown into a parison, which is a hollow preform of the glass container 26. The parison is then transferred from the blank mold to a blow mold. In the blow mold, the parison is blown with a compressed gas, usually air, to outwardly expand the parison to form the body 28 of the glass container 26. After being formed in the blow mold, the glass container 26 is removed from the container forming machine and transferred to a conveyor or other transport device.

The glass container 26 may be annealed in the annealing step 46 to relieve internal residual strain within the glass that typically results from forming the glass at elevated temperatures and then allowing the glass to cool rapidly. By alleviating such thermally-induced strain, the glass container 26 is rendered more fracture-proof and shatter-proof. The glass container 26 may be annealed in an annealing lehr. An annealing lehr is an elongated kiln having an end-to-end temperature gradient through which the glass container 26 is transported on rollers, a conveyor belt, or some other device that can transport the container 26 through the lehr. When transported through the annealing lehr from the entrance of the lehr to the exit of the lehr during the annealing step 46, the glass container 26 and, in particular, the body 28 of soda-lime-silica glass, is reheated and then cooled at a defined and controlled rate. The glass container 26 is first heated to a temperature above the annealing point of the glass, which usually lies within the range of 540° C. to 560° C., followed by slowly cooling the container 26 at a rate of 1° C./min to 10° C./min to a temperature below the strain point of the glass, which usually lies within the range of 510° C. to 540° C. The glass container 26 may be cooled relatively rapidly after it has been cooled to below the strain point.

The yellow coloration of the soda-lime-silica glass that constitutes the body 28 of the glass container 26 may be intensified in the optional striking step 48 after the glass container 26 is annealed. For instance, the yellow coloration of the body 28 of soda-lime-silica glass may be intensified to shift the coloration from a relatively lighter yellow to a darker, more vibrant yellow. "Striking" refers to a heat treatment process in which the glass is reheated and cooled to induce a change in the intensity of the yellow coloration of the glass. The glass container 26 may be struck by reheating the glass container 26, typically in a striking lehr or oven, to a temperature above the temperature attained during the annealing step 46 for a period of time to controllably grow the silver colloids present within the soda-lime-silica glass.

The controlled growth of the silver colloids during striking enhances the intensity of the yellow coloration since, as explained above, increasing the size of the silver colloids dispersed throughout the glass results in light being transmitted at wavelengths increasingly closer to the orange range of the visible light spectrum. Of course, care should be taken to not increase the size of the silver colloids too much as doing so could transition the coloration of the soda-lime-silica glass from yellow to amber. The temperature the soda-lime-silica glass reaches during striking and the length of time the glass is heated should therefore be devised and monitored to avoid over striking the glass. In a preferred embodiment, the soda-lime-silica glass of the glass container 26 may be heated to a temperature between 575° C. to 670° C., or more narrowly from 600° C. to 630° C., for a period of time ranging from 15 minutes to 45 minutes, or more narrowly from 20 minutes to 35 minutes, to strike a more intense yellow coloration in the glass. Additionally, during striking, the glass may be heated at a rate ranging from 25° C./min to 30° C./min, or more narrowly from 26.5° C./min to 28.5° C./min, and may be cooled at a rate ranging from 0.60° C./min to 10.66° C./min, or more narrowly from 7.7° C./min to 9.0° C./min, at least until the temperature of the glass has decreased to 100° C.

The glass-manufacturing process 40 described above with reference to FIG. 2 may include other steps as well. For example, one or more coatings may be applied to an exterior surface of the body 28 of soda-lime-silica glass. The coating(s) may include the hot-end coating (HEC) a "hot-end coating" (HEC), a "cold-end coating" (CEC), or both. A HEC is a metal oxide layer, such as tin oxide or titanium oxide, that is applied directly to the exterior surface of the body 28 of soda-lime-silica glass by chemical vapor deposition soon after the glass container 26 is formed. The HEC may be applied by exposing the glass container 26 to a volatized heat-decomposable metal oxide precursor material such as stannic chloride or MBTC (Monobutyltin trichloride), among other possibilities, before the annealing step 44. The CEC is a layer that includes a wax and/or a complex of fatty acids and is applied over the HEC by way of a liquid carrier or as a vapor. One example of a commonly-employed CEC is polyethylene wax, which may be applied by spraying an atomized aqueous emulsion of polyethylene wax onto the glass container 26 over the HEC and allowing the water to evaporate. The CEC may be applied after the annealing step 44 and, if striking is performed, after both the annealing step 46 and the striking step 48.

EXAMPLES

An example soda-lime-silica glass was prepared to demonstrate that glass with a yellow coloration can be attained. To produce the soda-lime-silica glass, a vitrifiable feedstock material composed of lab grade materials was melted in a mullite crucible in a Deltech furnace at 1450° C. for three hours. The resultant glass was poured, crushed, and then melted for an additional two hours at the same temperature, and then cooled. The soda-lime-silica glass had a batched composition (i.e., the theoretical composition calculated from the feedstock material) that included 73.5 wt % $SiO_2$, 13.5 wt % $Na_2O$, 11.2 wt % CaO, and 1.5 wt % $Al_2O_3$, and further included 0.0025 wt % $Ag_2O$, 0.04 wt % $Bi_2O_3$, 0.2 wt % SnO, 0.01 wt % $SO_3$, and 0 wt % of batched $Fe_2O_3$ to impart a yellow coloration. The vitrifiable feedstock material included 0.3 wt % carbon to bring the glass to a reduced state.

Figure 3:
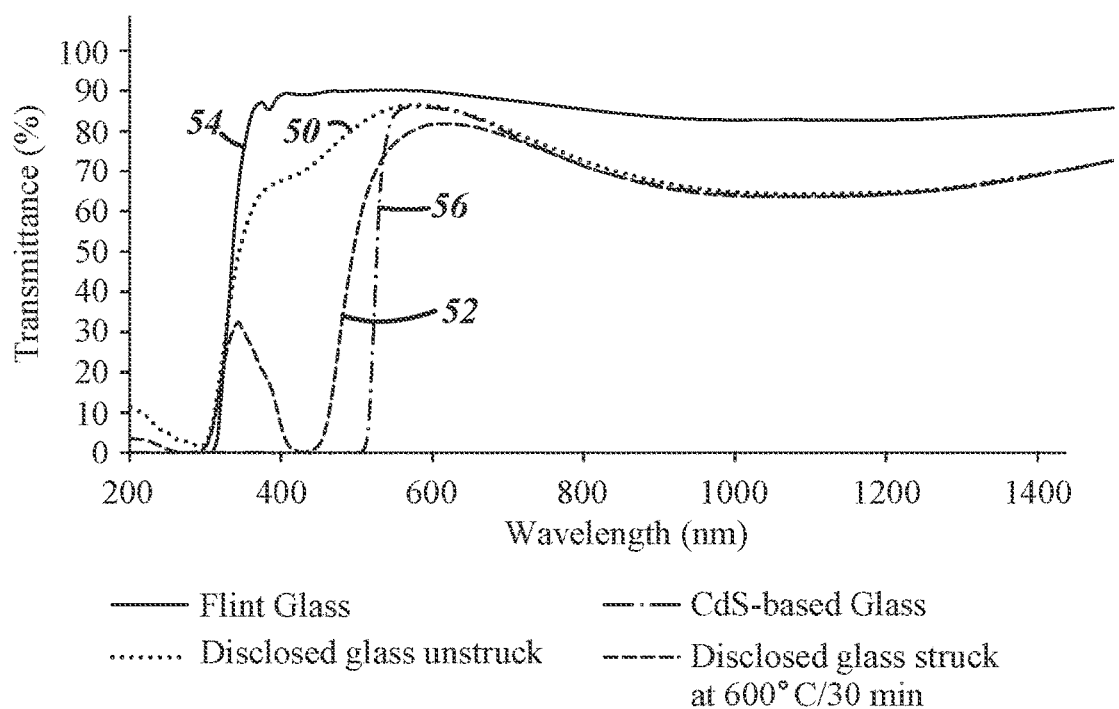
FIG. 3 is a ultraviolet-visible-near-infrared (UV-vis-NIR) spectroscopy graph showing the transmittance of light in the ultraviolet, visible, and near-infrared spectral regions of the electromagnetic spectrum for several sample glasses including flint glass, soda-lime-silica glass colored yellow by CdS, unstruck soda-lime-silica glass that exhibits a yellow coloration in accordance with the present disclosure, and struck soda-lime-silica glass that exhibits a yellow coloration in accordance with the present disclosure.

The produced soda-lime-silica glass was subjected to ultraviolet-visible-near-infrared (UV-Vis-NIR) spectroscopy, which measures and plots the transmittance of light in the ultraviolet, visible, and near-infrared spectral regions of the electromagnetic spectrum for the glass. The UV-vis-NIR spectra graph of the soda-lime-silica glass, both unstruck and struck, is shown in FIG. 3. The UV-vis-NIR spectra of the unstruck sample of the glass is identified by reference numeral 50 in FIG. 3 and the UV-vis-NIR spectra of the struck sample is identified by reference numeral 52. The struck sample of the soda-lime-silica glass was struck by heating the glass to a temperature of 600° C. and maintaining the glass at that temperature for 30 minutes. The glass was heated up to the striking temperature at a rate of 27.5° C. per minute and a cooled from the striking temperature at a rate of 0.833° C. per minute. For comparison purposes, the UV-vis-NIR spectra of flint (i.e., colorless) glass and the UV-vis-NIR spectra of glass colored yellow with CdS are also shown in FIG. 3. The flint glass is identified by reference numeral 54 and the CdS-based yellow glass is identified by reference numeral 56. As can be seen, both the unstruck and the struck soda-lime-silica glass samples 50, 52 had a relatively high transmittance at a wavelength of 580 nm, which corresponds to yellow color, and had lower transmittances below a wavelength of 580 nm, similar to the CdS glass sample 56. The unstruck and the struck soda-lime-silica glass samples 50, 52 also exhibited transmittance cutoffs around the wavelength associated with visible yellow (580 nm), likely due to the mie light scattering attributed to the dispersed silver colloids, although the cutoffs were not as sharp as that of the CdS glass sample 56.

There thus has been disclosed a soda-lime-silica glass having a composition that imparts a yellow coloration to the glass while being free of cadmium and lead, as well a method of making a glass container out of the soda-lime-silica glass. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A glass container comprising:
a soda-lime-silica glass in the form of a body that provides a shape of the container and defines an internal containment space, the body of the container including a base, a mouth that defines an opening to the internal containment space, and a wall that extends from a perimeter of the base to the mouth, the soda-lime-silica glass having a composition that comprises 60-80 wt % $SiO_2$; 8-18 wt % $Na_2O$; 5-15 wt % CaO; 0-3 wt % $Al_2O_3$; 0.0010-0.050 wt % silver expressed as $Ag_2O$; and 0.005-0.30 wt % bismuth expressed as $Bi_2O_3$; and wherein light-scattering silver colloids are dispersed throughout the soda-lime-silica glass to provide the glass with a yellow coloration.

2. The glass container set forth in claim 1, wherein the composition of the soda-lime-silica glass further comprises at least one of 0-0.4 wt % tin expressed as SnO; 0-0.15 wt % iron expressed as $Fe_2O_3$; 0-0.2 wt % sulfur expressed as $SO_3$; or combinations thereof.

3. The glass container set forth in claim 2, wherein the composition of the soda-lime-silica glass comprises at least one of 0.05-0.20 wt % tin expressed as SnO; 0.01-0.10 wt % iron expressed as $Fe_2O_3$; 0.005-0.03 wt % sulfur expressed as $SO_3$; or combinations thereof.

4. The glass container set forth in claim 1, wherein the composition of the soda-lime-silica glass comprises 0.0025-0.0050 wt % silver expressed as $Ag_2O$ and 0.01-0.16 wt % bismuth expressed as $Bi_2O_3$.

5. The glass container set forth in claim 4, wherein the composition of the soda-lime-silica glass further comprises 0.05-0.20 wt % tin expressed as SnO; 0.01-0.10 wt % iron expressed as $Fe_2O_3$; and 0.005-0.03 wt % sulfur expressed as $SO_3$.

6. The glass container set forth in claim 1, wherein the composition of the soda-lime-silica glass is free of cadmium and lead.

7. A glass container comprising:
a body of soda-lime-silica glass that provides a shape of the glass container about a central longitudinal axis and defines an internal containment space, the body of soda-lime-silica glass including a base, a mouth that defines an opening to the internal containment space, and a wall that extends from a perimeter of the base along the longitudinal axis of the container to the mouth; the body of soda-lime-silica glass having a composition comprising 60-80 wt % $SiO_2$; 8-18 wt % $Na_2O$; 5-15 wt % CaO; 0-3 wt % $Al_2O_3$; 0.0010-0.050 wt % silver expressed as $Ag_2O$; and 0.005-0.30 wt % bismuth expressed as $Bi_2O_3$; and wherein light-scattering silver colloids are dispersed throughout the body of soda-lime-silica glass to provide the glass with a yellow coloration.

8. The glass container set forth in claim 7, wherein the composition of the body of soda-lime-silica glass further comprises at least one of 0-0.4 wt % tin expressed as SnO; 0-0.15 wt % iron expressed as $Fe_2O_3$; 0-0.2 wt % sulfur expressed as $SO_3$; or combinations thereof.

9. The glass container set forth in claim 8, wherein the composition of the body of soda-lime-silica glass comprises at least one of 0.05-0.20 wt % tin expressed as SnO; 0.01-0.10 wt % iron expressed as $Fe_2O_3$; 0.005-0.03 wt % sulfur expressed as $SO_3$; or combinations thereof.

10. The glass container set forth in claim 7, wherein the composition of the body of the soda-lime-silica glass comprises 0.0025-0.0050 wt % silver expressed as $Ag_2O$ and 0.01-0.16 wt % bismuth expressed as $Bi_2O_3$.

11. The glass container set forth in claim 10, wherein the composition of the body of soda-lime-silica glass comprises 0.05-0.20 wt % tin expressed as SnO; 0.01-0.10 wt % iron expressed as $Fe_2O_3$; and 0.005-0.03 wt % sulfur expressed as $SO_3$.

12. The glass container set forth in claim 7, wherein the composition of the body of soda-lime-silica glass is free from cadmium and lead.

13. A method of making a glass container, the method comprising the steps of:
producing a melt of soda-lime-silica glass having a composition comprising 60-80 wt % $SiO_2$; 8-18 wt % $Na_2O$; 5-15 wt % CaO; 0-3 wt % $Al_2O_3$; 0.0010-0.050 wt % silver expressed as $Ag_2O$; and 0.005-0.30 wt % bismuth expressed as $Bi_2O_3$;
forming a glass container from the melt of soda-lime-silica glass, the glass container including a body that provides a shape of the glass container and which is comprised of the soda-lime-silica glass, wherein light-scattering silver colloids are dispersed throughout the body to provide the glass with a yellow coloration, and wherein the body defines an internal containment space and includes a base, a mouth that defines an opening to the internal containment space, and a wall that extends from a perimeter of the base to the mouth;
annealing the glass container by heating the body of soda-lime-silica glass to a temperature above an annealing point of the soda-lime-silica glass followed by cooling the glass container to a temperature below the strain point of the soda-lime-silica glass.

14. The method set forth in claim 13, further comprising:
striking the glass container, after annealing, by heating the body of soda-lime-silica glass to a temperature above the temperature reached during annealing for a period of time and then cooling the body of soda-lime-silica glass to intensify the yellow coloration provided by the glass.

15. The method as set forth in claim 14, wherein, during striking, the body of the soda-lime-silica glass is heated to a temperature ranging from 575° C. to 670° C. for a period of time ranging from 15 minutes to 45 minutes.

16. The method set forth in claim 13, wherein the composition of the soda-lime-silica glass comprises at least one of 0.05-0.20 wt % tin expressed as SnO; 0.01-0.10 wt % iron expressed as $Fe_2O_3$; 0.005-0.03 wt % sulfur expressed as $SO_3$; or combinations thereof.

* * * * *